Dec. 30, 1969     C. R. JOHNSON     3,487,308
VARIABLE DISPLAY HAVING A REFERENCE AND A CODE FOR
INDICATING ABSOLUTE VALUES OF THE REFERENCE
Filed Dec. 12, 1966     3 Sheets-Sheet 1

INVENTOR.
CHARLES R. JOHNSON
BY
*Sidney Magnes*
AGENT

INVENTOR.
CHARLES R. JOHNSON
BY
Sidney Magnes
AGENT

INVENTOR.
CHARLES R. JOHNSON

United States Patent Office 3,487,308
Patented Dec. 30, 1969

3,487,308
VARIABLE DISPLAY HAVING A REFERENCE AND A CODE FOR INDICATING ABSOLUTE VALUES OF THE REFERENCE
Charles R. Johnson, La Mirada, Calif., assignor to North American Rockwell Corporation, a corporation of Delaware
Filed Dec. 12, 1966, Ser. No. 600,935
Int. Cl. G01f 7/00
U.S. Cl. 324—140                24 Claims

ABSTRACT OF THE DISCLOSURE

This invention relates to a visual display; and more particularly to a way of scaling the display so that the display may cover a wide span of values. Briefly stated, the disclosed apparatus uses the largest incoming-signal to control the gain of an amplifier so that this largest-signal takes the maximunm amount of room available for a display—the other signals producing displays of proportionate sizes. In this way, small incoming-signals are amplified, and large incoming-signals are compressed—so that a large range of signals may be displayed.

Figure 1A:
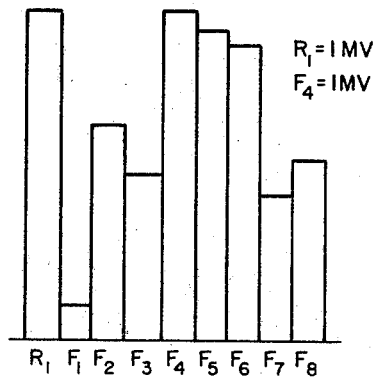

In order to indicate the absolute values of the displays, the apparatus produces one of several available reference displays; and the widths of selected displays act as a code that indicates the absolute value of the reference—and thus indicates the absolute values of the displays corresponding to the various incoming-signals.

Background

It is well known that many types of graphs, charts, and visual aids are widely used to display the relation between various factors; these factors representing such quantities as, for example, sales, temperatures, rainfall, the amplitude of electrical signals, etc. In these displays, it is frequently desirable to show the relations for various conditions; such as seasonal variations in sales, geographical variations in rainfall, variation of electrical signals under controlled and uncontrolled conditions, etc. As a result, the magnitudes of these quantities vary greatly from one display to the next. For example, a display for sales during the holiday season may require a scale representing thousands of units, whereas the display for sales during the summer months may require a scale representing only dozens of units. These variations of magnitude introduce the problem that once an arbitrary scale has been assigned to a display, season or other conditions may cause some magnitude to extend off-scale, and may cause other magnitude to be so small as to be virtually unreadable.

The most widely used prior-art solution for this problem was to use different scales for the various displays, and to fit the various quantities into these scaled displays. While this solution was feasible for many displays, the printing-out of the scale became onerous and time consuming; and, generally, the selected scale did not permit maximum utilization of the displayed area.

Objects and drawings

It is therefore an object of the present invention to provide an improved display.

It is another object of the present invention to provide a display that provides improved usability by always utilizing the maximum amount of room available.

It is another object of the invention to provide coding means for indicating the scale of the display.

The attainment of these results and others will be realized from the teachings of the following specification, taken in conjunction with the drawings of which;

FIGURE 1 is a series of bar-charts that have been expanded to utilize all the available room, and have been coded to indicate the scale of the bar charts; and FIGURE 2 is a schematic drawing illustrating circuitry for achieving the display of FIGURE 1.

Synopsis

Broadly speaking, the present invention relates to a display on a visual-display device, such as a cathode ray tube or a printed sheet of paper; the display being sized to occupy the maximum amount of room available for the display. Another feature of the invention is a coding means for indicating the scale of the display; the coding means comprising changes in the characteristics of selected elements of the display.

Introduction

Of the various types of displays used to compare the magnitudes of various quantities, the so-called "bar-chart" is one of the most useful. As is well known, a bar-chart generally comprises a series of parallel bars whose lengths represent the magnitude of various factors. In order to illustrate the use and operation of the invention, the following explanation will be presented in terms of a bar-chart—which, however, is merely exemplary of one of the several uses of the invention. Other uses will be discussed later.

While bar-charts have wide usefulness, a new use for them has recently been found. It is known that many earthquakes are proceeded by minor shifts of the earth's structure; these shifts producing shock-waves. It is further known that these shock-waves comprise different frequencies; and it is believed that analysis of these shock-waves may help in the prediction of earthquakes. To do this, the shock-waves must be separated into their various frequency spectra; and the amount of energy in each frequency spectra must be recorded and analyzed. It will be obvious that a bar-chart is an extremely good way of comparing the energy in the various frequency spectra.

However, the following problem arises. During quiescent periods, when there are no shock-waves, very little energy appears in these various spectra; whereas during a shock-wave, the energy in the various spectra may increase by as much as ten thousand times. This introduces the previously mentioned problem of a different scale for the various bar-charts.

Disclosure

The present invention solves the problem in the following way. Referring first to FIGURE 1a, there is shown a typical bar-chart, comprising nine vertical bars. The first bar, identified as R1, is a reference-bar that will be discussed later; and the next eight bars—identified as F1, F2, F3, . . . F8—have heights that represent the energy in each of eight typical frequency spectra. As may be seen from FIGURE 1a, the amount of energy in the different spectra may vary a great deal; and the bar-chart is an excellent way of portraying the relative amounts of energy in each of the eight spectra. In FIGURE 1a, it is assumed that the most energy appears in spectrum F4; and is assumed further that the F4 bar represents a relatively small amplitude of one millivolt (mv.). In accordance with the present invention, the signal producing the F4 bar is amplified until the vertical height of the F4 bar uses substantially the entire available height of the display device—this amplification to use substantially the maximum available display space to be designated as "normalizing"; the other bars assuming proportional lengths that depend upon the energy in their particular spectrum.

For reasons to be discussed later, the reference bar R1. in FIGURE 1a, has a reference-value of one millivolt (mv.); and therefore it has the same height as the F4 bar; so the energy of each spectrum may be readily determined by comparing the height of its bar with the height of reference bar R1.

Figure 1B:
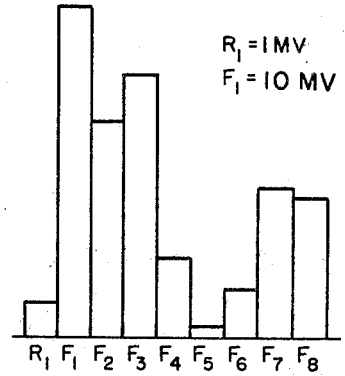

Assume now that a slightly stronger signal is received; and FIGURE 1b illustrates a bar-chart where bar F1 contains the most energy, and represents a somewhat higher magnitude of 10 mv. Again, in accordance with the present invention, the F1 signal—which has the largest magnitude—is normalized (amplified so that the vertical height of the F1 bar uses substantially the entire available height of the display device); the other bars again assuming proportionate lengths.

Since the R1 bar still has a reference-value of 1 millivolt, it assumes a height of one-tenth that of the 10 mv. F1 bar; and it may be seen from FIGURE 1b that the R1 reference-bar permits the viewer to make the quick estimation of the amount of energy in any of the frequency spectra F1 through F8.

It will be noted that in FIGURE 1a and FIGURE 1b the widths of reference-bar R1 and the first bar F1 are equal; and in accordance with the present invention, these equal widths act as a code that indicates the reference bar has a given reference-value—in this case 1 millivolt.

Figure 1C:
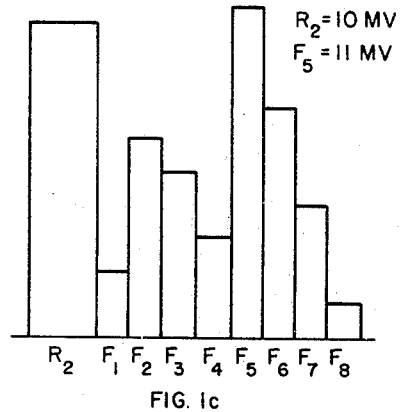

Assume now that a somewhat stronger signal is received, and that—as illustrated in FIGURE 1c—F5 represents, say 11 millivolts. In accordance with the previous discussion, the F5 bar is normalized to occupy the available vertical space for the bar-chart; and the reference-bar R2, in a manner to be described later, now represents ten millivolts, and is shown as being slightly shorter than the 11 millivolt F5 bar.

It may be seen that in FIGURE 1c, the refernece bar R2 is wider than the F1 bar; and this combination of coding widths (wide R1 and relatively narrow F1) indicatees to the observer that the R2 bar now represents ten millivolts, mv.)—whereas in FIGURES 1a and 1b the equal narrow widths of the R1 and F1 bars acted as a code to indicate that the reference bar had an amplitude of 1 mv. It is thus apparent that by changing the coding widths, the observer can readily realize that the reference bar has a different value, or scale (millivolts per unit of length).

Figure 1D:
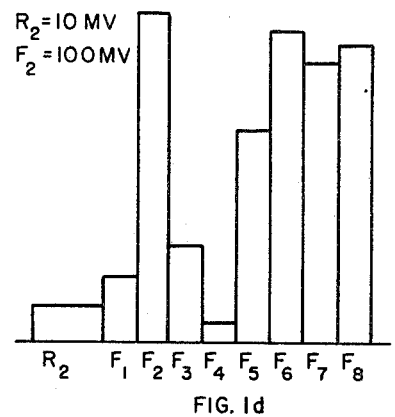

Referring now to FIGURE 1d, in this case F2 contains the most energy, assumed to be 100 mv.; and has been normalized to occupy the full height of the display. In FIGURE 1d, the 10 mv. R2 bar therefore assume a height that is one-tenth of the 100 millivolt F2 bar. It will be realized, from the widths of the R2 and F1 bars in FIGURE 1d, that the reference-value is still 10 mv.; and therefore the value of each bar can be estimated in terms of the height of the R2 reference-bar.

Figure 1E:
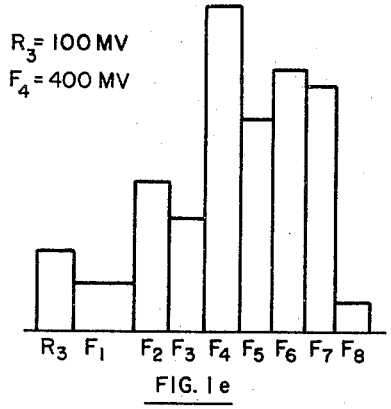

Referring now to FIGURE 1e, here it is assumed that the F4 bar contains the most energy, in this case 400 mv.; and has been normalized to occupy substantially the maximum height of the display. It is also seen that the R3 bar has a narrow width, and that the F1 bar has a wide width. This combination of widths forms a code that indicates the value of the R3 bar to be, in this case, 100 mv. In accordance with the previous discussion, since the maximum-value F4 bar represents 400 mv., the 100 mv. R3 bar automatically becomes one-fourth as high.

Figure 1F:
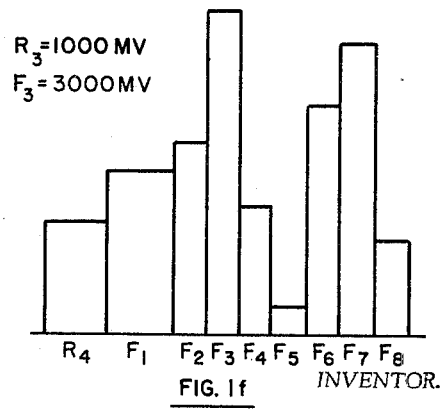

Referring now to FIGURE 1f, it is assumed here that the F3 spectrum has the largest magnitude, in this case assumed to be 3,000 mv.; and is normalized to occupy the maximum height of the display. In accordance with the previous discussion, the wide R4 and wide F1 bar taken together, code the R4 bar as having a value of 1,000 mv.

It will be understood from the previous discussion of FIGURE 1, that various groups of input signals may be shown in the form of bar-charts, and that each bar-chart includes a reference-bar of a particular value; the reference-bar being coded by the relative widths of the reference and first bars to indicate the scale. All of the bars are shown in relative lengths, along with a suitable-value reference bar; and when the incoming signals change, the scale changes accordingly, so that the value of each spectrum is clearly shown by a reference-bar. Moreover, the normalizing concept of amplifying the strongest signal to occupy the maximal available height of the display permits each group of input signals to be displayed at a suitable scale that shows the strongest signal, and still permits the weakest signal to have a bar with a useful length.

It may be seen that the illustrated arrangement produces visual displays having four scales; in this way producing the same effect as a meter that has a four-position knob for reading four different scales.

Circuit description

Figure 2A:
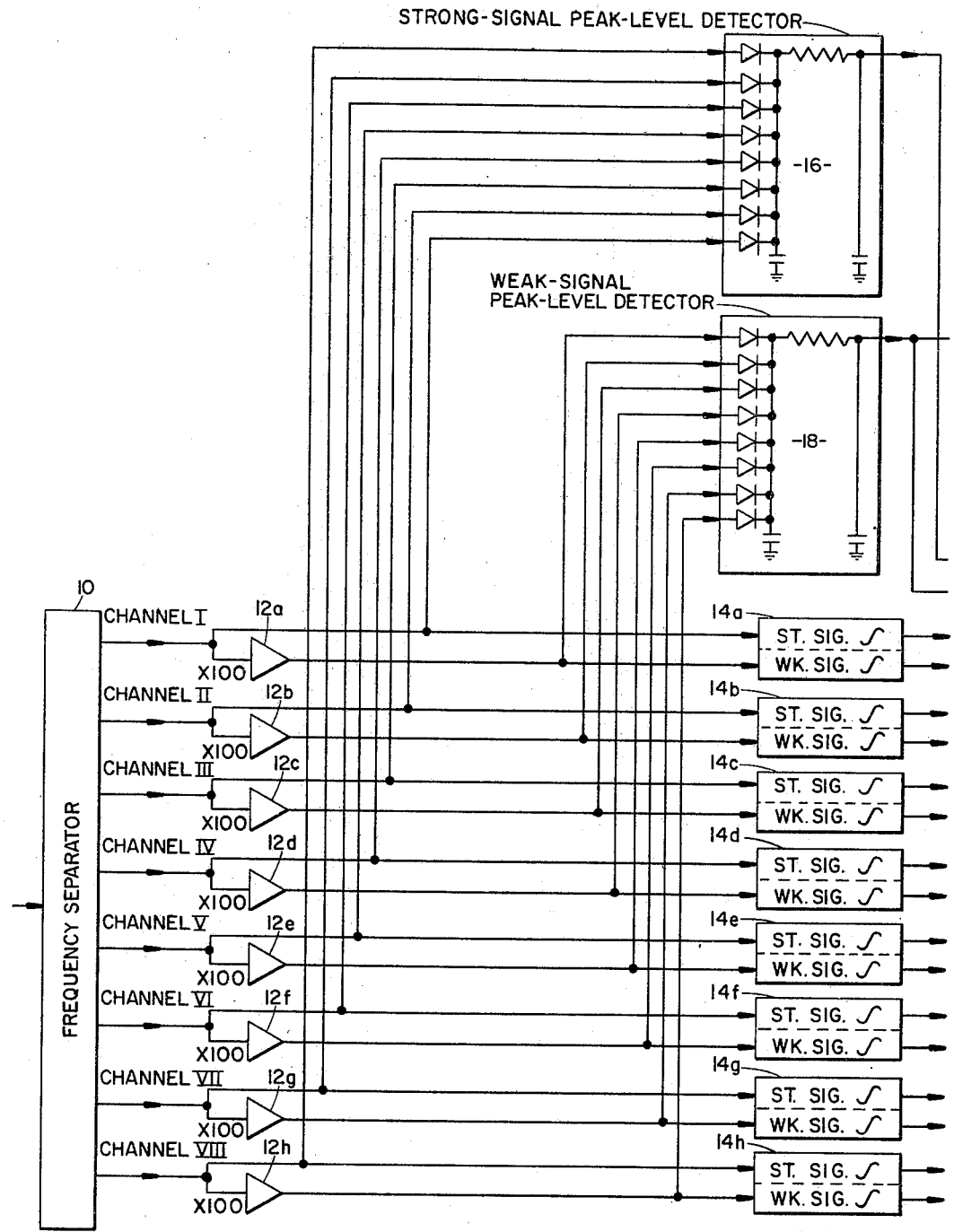

For the purpose of analyzing shock-waves, the bar-chart display discussed in connection with FIGURE 1 may be obtained from the circuit illustrated in FIGURE 2a. Here an incoming signal representing the shock-waves is applied to a frequency separator, 10, that comprises circuitry—such as filters—that divides the incoming signal into, typically, eight spectra—each spectrum appearing as a signal on a respective channel. Each channel signal has a bandwidth, or spectrum, suitable for the desired display; signals for each channel appeared at individual output terminals. In this way, the incoming signal is separated into various spectra; and since various shock-waves have "signatures" wherein various spectra have predetermined relations with each other, the frequency separator 10 produces a desired number of spectra that are of interest for determining the signature of, or for analyzing, the incoming signal.

In order to be able to handle a wide span of signal strengths, the output of each channel is split into two separate paths. One path is a direct connection, for handling strong signals; and the other path contains an amplifier (12a, 12b, 12c, etc.), for amplifying weak signals. In the illustration, amplifiers 12 have a gain of about one hundred; that is, they amplify their input one-hundred times.

The dual outputs of the channels are applied to respective integrators 14a, 14b, 14c . . . 14h; each integrator 14 being divided into two sub-integrators; one designed to rectify and integrate the strong signal, and the other designed to rectify and integrate the amplified weak signal.

It will be noted that the strong signal of each channel is also applied to a strong-signal peak-level detector 16; and that the weak signal of each channel is applied to a weak-signal peak-level detector 18. Each of these peak-level detectors may comprise a channel-isolation diode for each incoming channel; an R-C integrator circuit's inherent operation being such that it stores the highest-valued, or "peak," signal applied to it. As the channel signals are applied, in a parallel manner, to the strong-signal peak-level detector 16 and to the weak-signal peak detector 18, the strong-signal peak-level detector 16 produces an output that corresponds to the highest-valued strong signal, and the weak-signal peak-level detector 18 produces an output that corresponds to the highest-valued weak-signal. The circuits 16 and 18, of course, have suitable time-constants that allow the instantaneous peak signal to leak off, and to be replaced by a subsequent peak signal.

Figure 2B:
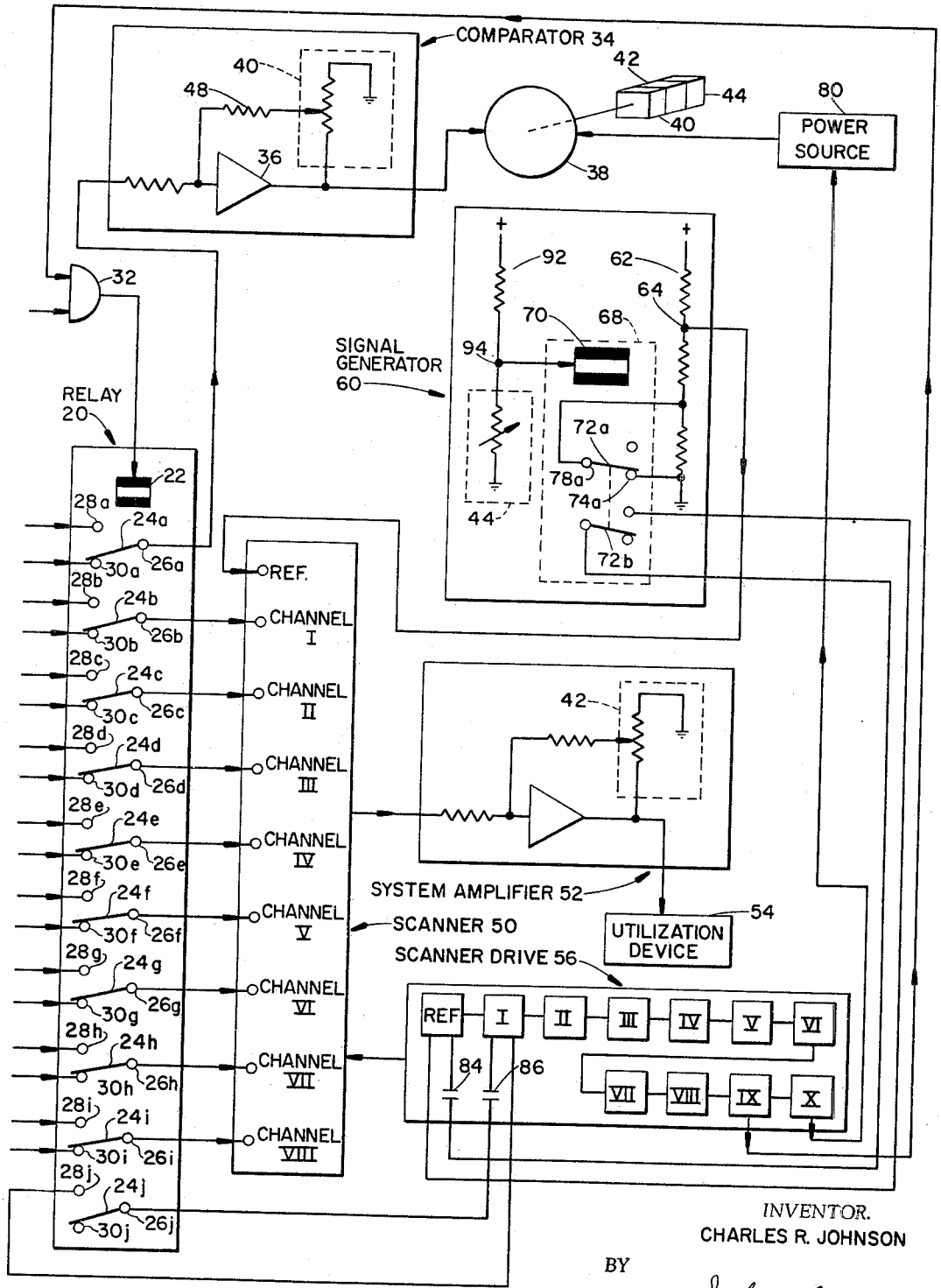

FIGURE 2b shows a relay 20 having a plurality of ganged switches 24a, 24b, 24c . . . 24j; each switch having an output terminal 26a, 26b, 26d . . . 26j. Relay 20 is of the "double throw" type, so there are two input terminals 28a and 30a for switch 24a; two input terminals 28b and 30b for switch 24b; etc.

It will be recalled that the weak-signal peak-level detector 18 produces an output "strength" signal corresponding to the highest-valued amplified weak signal; and this strength-signal is applied to an AND circuit 32, from whence it is applied—when AND circuit 32 is enabled, in a manner to be directed later—to the field coil 22 of relay 20. If the strength-signal of detector 18 is strong enough, it flips relay 20 to assume a particular state wherein the ganged-switches 24 are in their upper, unshown, "strong-signal" position. If on the other hand, the strength-signal of detector 18 is not strong enough to flip relay 20, ganged-switches 24 remain in their lower "weak-signal" position, as illustrated.

FIGURE 2b also shows that the output of the strong-signal peak-level detector 16 is applied to the first input terminal 28a associated with relay-switch 24a; and that the output of the weak-signal peak-level detector 18 is applied to the second input terminal 30a associated with relay-switch 24a—so that, depending upon the position of relay switch 24a, either the highest-valued strong signal or the highest-valued amplified weak signal is applied to a comparator 34 that has an input from the output terminal 26a of switch 24a.

Comparator 34 may take any of several forms, the illustration showing a well known operational amplifier 36. This unit has a very high amplification that operates in a negative sense; that is, if the input signal increases, the output signal is increased many fold in a negative direction. The output signal is then fed back to the input over a controlled feedback loop, to counteract the effect of the increased input signal. In this way, the operational amplifier 36 trys to hold its input signal at a constant value, regardless of its fluctuations; the output of operational amplifier 36 indicating the "difficulty" of achieving this result.

It will be noted that the output of comparator 34 is applied to a motor 38; so that if the output of comparator 34 is a positive-going signal, motor 38—when suitably powered, in a manner to be described later—will rotate in one direction. Conversely, if the output of comparator 34 is a negative-going signal, motor 38 will rotate in the opposite direction. As indicated schematically, as motor 38 rotates, it resets three potentiometers 40, 42, and 44; the effects of these potentiometers to be explained subsequentially.

Referring again to FIGURE 2, it is seen that the various integrators 14a, 14b, etc. apply their integrated strong and weak signals to sets of input terminals 28b, 30b; 28c, 30c; 28d, 30d; etc. of relay 20. Depending upon the position of ganged relay-switches 24, one set of these integrated signals is available at the output terminals 26b, 26c, 26d, etc. The output signals at relay output terminals 26b-26i are applied to a scanner 50—which may be a stepping switch, an electronic circuit, or the like—that produces sequential outputs corresponding to the inputs of the scanner; these sequential outputs of scanner 50 being applied to a system-amplifier 52, from where they are applied to a utilization device 54.

Operation

In order to more clearly explain the operation of the circuit, the following heuristic exposition will include a plurality of numerical values; but these are not to be construed as limiting, since their function is only to provide an easily understood explanation.

Assume now that an incoming signal corresponding to the bar-chart of FIGURE 1a is applied to frequency-separator 10; channel IV producing the strongest signal, actually a very weak signal of 1 mv. In the manner previously described, the weak 1 mv. signal of channel IV is split, part of it being amplified, by amplifier 12d, to a value of 100×1 mv.=100 mv.; this 100 mv. amplified weak-signal being applied to weak-signal detector 18; whereas the original 1 mv. un-amplified signal is applied directly to strong-signal detector 18. The other channel-signals, having lower values, are split, amplified, and applied in a similar manner. Since the amplified 100 mv. signal of channel IV is the strongest signal applied to weak-signal peak-level detector 18, a 100 mv. signal is obtained from detector 18.

As discussed previously, the signal from detector 18 is used to control relay 20; and, arbitrarily, a channel-signal that is equal to, or smaller than, 100 mv. is considered to be a weak signal. In this particular case, the strength-signal from detector 18—when applied through AND circuit 32 to relay field-coil 22—is not strong enough to flip relay 20, which therefore remains in its "weak-signal" state, with the ganged relay-switches 24 in their lower illustrated weak-signal positions. As a result, the highest-valued weak-signal (the 100 mv. amplified weak-signal from channel IV) is applied from detector 18 through switch 24a to comparator 34.

Referring to comparator 34 of FIGURE 2, the F4, 100 mv. amplified-weak-signal is applied to the input of operational amplifier 36—which, as previously explained, operates in such a manner that its feedback connection 48 constantly attempts to maintain the input signal at the same level. Therefore, the output of the operational amplifier 36 is an error-signal that rotates motor 38 in a given direction; and, as previously discussed, rotation of motor 38 adjusts potentiometers 40, 42, and 44 to produce control-signals; potentiometer 40 being part of the feedback network of comparator 34. Therefore motor 38 is rotated to a given extent; at which time the variable feedback loop 40, 48 produces such a large feedback signal that the increase of the input signal is nullified, and thus causes the error-signal of operational amplifier 36 to be reduced to zero. Motor rotation therefore ceases.

It was pointed out that rotation of motor 38 also adjusts potentiometer 42; and it will be noted that the potentiometer 42 is part of the feedback circuit of system-amplifier 52, which is also an operational amplifier. Thus rotation of motor 38 also causes potentiometer 42 to produce a control-signal that controls the feedback, and thus the gain of system-amplifier 52. Therefore, when comparator 34 causes motor 38 to assume a given angular orientation for the 100 mv. F4 amplified-weak-signal, it automatically causes system-amplifier 52 to achieve a particular amount of gain.

In order to understand the gain requirements of system-amplifier 52, assume that a 10,000 mv. signal (designated as a "display-voltage") is required from the output of amplifier 52 to make a bar long enough to occupy the maximum available height of the display device—which may be a cathode ray tube, a print-out device, or the like. Therefore, system-amplifier 52 must amplify its 100 mv. input signal to a value of 10,000 mv.; that is, it must have a gain of 100 (100×100 mv.=10,000 mv.—the desired display-voltage). Therefore, the particular motor orientation produced by the 100 mv. F4 amplified weak signal adjusts potentiometer 42 to such a point that system-amplifier 52 achives the desired gain of 100. Therefore, the 100 mv. F4 amplified-weak-signal is amplified to the desired 10,000 mv. display voltage. In this way, the strongest weak-signal of FIGURE 1a is normalized to occupy substantially the maximum display height of the display device.

FIGURE 2b shows a scanner drive 56 that causes scanner 50 to produce sequential output signals from its various scanner terminals. If scanner 50 is a mechanical stepping switch, scanner drive 56 may be a continuously rotating motor, a step motor, a pulse-generator, etc., that causes the scanner to step from one position to another, thus producing sequential outputs. If scanner 50 is an electronic device comprising diodes or transistors that are sequentially conductivated to produce paths that produce sequential scanner output signals, scanner drive 56 may take the form of a shift register comprising a series of binary flip-flop devices that automatically step along, and produce a series of output pulses that drive scanner 50 to produce sequential output signals.

In any case, as scanner drive 56 drives scanner 50, spaced pulses are automatically produced, the normal time interval of or between the pulses permitting the instantaneous signal from scanner 50 to be maintained for a given interval of time; after which the signal from the next channel is maintained for a similar interval of time; in this way producing the equi-width bar-chart of FIGURE 1.

Attention is now directed to the production of the reference-bar, R1, of FIGURE 1a. As has been previously discussed, the bar-chart of FIGURE 1a includes a reference bar R1 having a predetermined value for establishing a scale, and thus indicating the value of the other bars of the bar-chart. The reference-bar is produced as follows. A signal generator 60 comprises a voltage-divider 62 having one end connected to ground, and having a voltage applied to its other end. A reference signal is obtained from an intermediate point 64 of voltage-divider 62; and is applied to a reference terminal of scanner 50, from whence it produces a bar, in the same manner as though it were a channel-signal.

It is well known that if a voltage is applied across a voltage-divider, an intermediate point of the voltage-divider produces an electrical signal that depends primarily upon the applied voltage and upon the position of the intermediate point. It is also known that the electrical signal obtained from a fixed intermediate point of a voltage-divider can be changed by changing the applied voltage, or by changing the ground point of the voltage-divider. The latter approach, namely changing the ground point of the voltage-divider, is used in signal generator 60.

This result is achieved as follows. Signal generator 60 contains a relay 68 having a field coil 70 and two switches 72a and 72b. The grounded end of voltage-divider 62 is connected to one terminal 74a of relay 68, and a second intermediate point of the voltage-divider is connected to another terminal 78a of relay 68. Thus, when relay-switch 72a is in its upper (not illustrated) position, voltage-divider 62 has its lower end connected to ground, and has its intermediate point 76 unconnected; whereas when switch 72a is in its lower (illustrated) position, the intermediate point 76 of voltage-divider 62 is connected to ground. As discussed previously, depending upon which point of voltage-divider 62 is connected to ground, the output signal from intermediate point 64 will be changed.

In the present case, the applied potential, resistive-values, and the intermediate-points of voltage-divider 62 are such that when switch 72a is in the lower position as shown, intermediate point 76 is connected to ground, and a low-level reference-signal of 100 mv. is produced at intermediate point 64; whereas when switch 72a is at its upper (unshown) position, the lower end of voltage-divider 62 is connected to ground, and a high-value reference-signal of 1,000 mv. is produced at intermediate point 64. In either case, the reference-signal is applied from intermediate point 64 to the reference terminal of scanner 50.

Therefore, as scanner 50 is sequenced in the manner previously described, the reference-signal is applied to, and amplified by, system-amplifier 52; and a reference bar is generated along with the other bars of the bar-chart. It is obvious that all signals producing the bar-chart are amplified to the same extent by system-amplifier 52; and the resultant bar-chart is displayed by utilization device 54.

It may thus be seen that for the conditions of FIGURE 1a, the circuit described above produces a reference bar having a reference level of 100 mv., and produces a series of bars wherein the highest valued bar F4 (assumed to be 1 mv., but amplified to 100 mv.) is normalized to occupy substantially the maximum amount of room available for the display. Since the reference-bar R1 is also 100 mv., its height in the bar-chart display of FIGURE 1a is the same as for bar F4. In this way, the scale for the bar-chart is preset so that the strongest of the channel signals is normalized to occupy the maximum space, thus automatically displaying all of the shorter bars of the bar-chart, each bar being easily read in terms of the height of the reference-bar R1.

It should be noted that in FIGURE 1a, reference bar R1 has a narrow width. This indicates that even though the reference level is actually 100 mv., it is to be interpreted as having a reference value of 1 mv., in order to act as a reference for the 1 mv. F4 channel-signal.

Assume now that a group of signals corresponding to FIGURE 1b exist; in this case, the strongest signal (bar F1) having an amplitude of 10 mv., rather than the 1 mv. previously available. If this were to occur with the prior scale and amplification, bar F1 would expand vertically to such an extent that its upper end would be far off-scale. However, as indicated previously, the present invention operates in such a manner that the largest bar is normalized to occupy the maximum height of the display. This result is accomplished as follows.

When the incoming signal changes its makeup, the strongest of the weak signals (F1 in this case) is applied to—and appears at the output of—strong-signal detector 16; and also (amplified by 100 to a 100×10 mv.=1,000 mv. magnitude) is applied to—and appears at the output of, weak-signal peak-level detector 18. However, a channel signal of 10 mv. is still considered a weak signal, and when it traverses weak-signal detector 18, its now-amplified 1,000 mv. amplitude is not strong enough to reset relay 20—which therefore remains in its "weak-signal" setting, with the ganged relay-switches 24 in their lower position as illustrated. From detector 18, the new 1,000 mv. amplified F1 signal is applied to terminal 30a of the relay, and thence to comparator 34.

At this time, comparator 34 receives a 1,000 mv. input signal that is stronger than its previous 100 mv. input signal. As a result, operational amplifier 36 produces a very strong negative-going error-signal. This causes motor 38 to rotate in a given direction; and as motor 38 rotates, it resets potentiometers 40, 42, and 44. As previously discussed, potentiometer 40 is electrically connected in the circuit of comparator 34. Since the input signal to comparator 34 has increased from 100 mv. to 1,000 mv., additional feedback is necessary to offset the change, so motor 38 rotates to reset potentiometer 40 for increased feedback. When the proper amount of feedback has been achieved, the error-signal of operational amplifier 36 decreases to zero; and motor 38 stops its rotation at a particular point.

As previously discussed, potentiometer 42, attached to the shaft of motor 38, is electrically connected in the circuit of the system-amplifier 52, where it adjusts the gain of the system-amplifier 52 that controls the vertical size of the bar-charts. Since the new 1,000 mv. input signal F1 has increased to a value where it would ordinarily be off-scale compared with the amplification required for FIGURE 1a, the amplification of system-amplifier 52, must be decreased; and therefore potentiometer 42 is rotated by motor 38 to a position where it decreases the gain of system-amplifier 52. The final stopping point of potentiometer 42, as controlled by motor 38, is such that system amplifier 52 now has a gain of ten, so that the F1 1,000 mv. amplified-weak-signal now receives an additional amplification of ten, so that the output of the system-amplifier 52 is 10×1,000 mv.=10,000 mv.; the desired display-voltage. Thus, bar F1 of FIGURE 1b has been normalized to occupy the maximum available height of the display, as shown in FIGURE 1b, all of the other signals undergoing similar amplification (or, in this case, de-amplification) to produce bars of proportionate heights.

The same 100 mv. reference level for R1 is maintained, although—because of the reduced system amplification—reference-bar R1 now assumes a height that is one-tenth that of the 10 mv. F1 bar, as shown in FIGURE 1b. In this way, the circuit has operated to maintain the strongest channel-signal at substantially the maximum height available in the display; has produced bars F1–F8 that have proportional heights controlled by the input signal; and has produced a reference bar R1.

The narrow width of reference bar R1 in FIGURE 1b again indicates that even thought the actual reference voltage is 100 mv., it is to be interpreted as 1 mv. in order to act as a reference for a 10 mv. channel signal.

Assume now that the signals of FIGURE 1c are present, the strongest signal (bar F5) having an amplitude of 11 mv., rather than the 10 mv. signal previously applied. As previously explained, the amplified $$100 \times 11 \text{ mv.} = 1,100 \text{ mv.}$$

signal is not strong enough to flip relay 20, which remains in its illustrated weak-signal state. Also as previously explained, the amplified 1,100 mv. signal traverses detector 18, switch 24a; and is applied to comparator 34. In the previously described manner, motor 38 rotates to reduce the gain of system-amplifier 52, so that bar F5 of FIGURE 1c achieves a display-voltage of 10,000 mv. to occupy the maximum available height of the display; the other channel signals receiving proportionate amplification.

However, because the normalized bar represents 11 mv., a 1 mv. reference-bar is considered too small to be useful, so the reference signal is now changed to provide a better scale for the higher magnitude 11 mv. channel signal; and this is accomplished as follows. As motor 38 rotates, it resets potentiometers 40, 42, and 44 as previously indicated; attention being directed to the fact that potentiometer 44 is part of signal-generator 60. Specifically, potentiometer 44 is part of a control voltage-divider 92, which has an intermediate point 94 that produces a control signal that is applied to field coil 70 of relay 68. As motor 38 is rotated to accommodate the 1,100 mv. channel signal F5 of FIGURE 1c, it rotates potentiometer 44, which assumes such a value that the control signal from intermediate point 94 is large enough to trip relay 68; which causes relay-switches 72a and 72b to take their upper (not illustrated) positions. At this time, switch 72a grounds intermediate point 76; and therefore, as previously described, the reference signal at intermediate point 64 increases from its original value of 100 mv. to a new value of 1,000 mv.—the reference signal still being applied from intermediate point 64 to the reference terminal of scanner 50.

Now, when the 1,000 mv. reference value at scanner 50 produces the reference bar R2 of FIGURE 1c, the level of this reference bar is 1,000 mv.; and almost as high as the 11 mv. amplified by 100=1,100 mv. value for F5—as illustrated in FIGURE 1c. In this way, a more suitably-valued reference-bar R2 is produced.

In order to indicate to the observer that the reference value has changed, reference bar R2 of FIGURE 1c now has an increased width, this result being accomplished as follows. Referring back to signal generator 60, it is seen that relay 68 has two switches—72a and 72b; switch 72a being used to change the reference-signal as described above; and relay-switch 72b being used to provide a code-width signal that controls the width of the reference bar in the following manner.

As previously discussed, the width of the bars depend upon the operation of scanner drive 56, the normal operation thereof producing bars of equal width by producing pulses or movements of suitable magnitude. In order to increase the width of the reference bar, a somewhat abnormal operation of the scanner drive 56 must be achieved.

In those cases where scanner drive 56 is an electronic circuit, it comprises a series of well known flip-flop circuits whose time constants depend upon well known RC circuits. Therefore, by increasing either the R or the C value, a wider pulse can be produced; this wider pulse producing a wider bar.

Referring back to signal-generator 60, at its flipped not-illustrated upper setting, switch 72b adds a capacitance 84 in the RC timing circuit of the first flip-flop of scanner drive 56, so that the time interval of the reference-bar R2 is longer than ordinarily; thus producing the wider reference bar R2 of FIGURE 1c. In this way, a new reference value, and a new width for the reference bar are introduced.

In those cases where a narrower reference-bar is desired, or where a shorter pulse is needed to produce a wider reference-bar, switch 72b may be used to remove, rather than to add, capacitance. Other electronic scanner drives, or motors, may require a pulse of a given polarity or amplitude to produce a different-width reference-bar, and under these conditions relay-switch 72b may be used to transmit this pulse. In any case, when the reference-signal changes, signal-generator 60 provides a coding-width signal for changing the width of the reference-bar.

It should be noted that reference-bar R2 of FIGURE 1c actually has a reference signal of 1,000 mv.; but its increased width indicates that it should be interpreted as having a reference-value of 10 mv. for comparison with an 11 mv. channel-signal.

Assume now that a signal corresponding to the bar-chart of FIGURE 1d appears. In this case, the largest value is for F2, the value assumed to be 100 mv. If the amplified 100×100 mv.=10,000 mv. signal were applied to system amplifier 52 while this amplifier has its previous high-gain, the resultant bar would of course extend far off-scale, so the system amplification of all the signals is reduced as previously explained; motor 38 continuing its rotation as previously described until the gain of system-amplifier 52 is decreased to the point where bar representing F2 is normalized to occupy substantially the maximum allowable space of the display. It should be noted that in FIGURE 1d the reference bar R2 is also proportionately reduced in size, because of the reduced system amplification. but its increased width is maintained to indicate that the reference value is 10 mv. for comparison with a 100 mv. channel signal.

Assume now that the channel signals correspond to those shown in FIGURE 1e, the largest component F4 now having a magnitude of about 400 mv. As discussed previously, any channel-signal greater than 100 mv. is considered to be a strong-signal; and the amplified 100×400 mv.=40,000 mv. signal from detector 18 now flips relay 20 of FIGURE 2b so that its ganged relay-switches 24 are in the upward (not illustrated) positions. At this time the 400 mv. strong signal would appear at the output of strong-signal detector 16, and at relay input terminal 28a; while an amplified signal of 400 mv. amplified by an amplifier 12 (having an amplitude of 100×400=40,000 mv.) would appear at the output of detector 18 and relay input terminal 30a.

As the channel-signals increase in strength, the effect of amplifiers 12 would be to cause progressively higher intensity signals to appear at detector 18 and relay terminals 30a, 30b, 30c, etc. These high-intensity signals are considered to be undesirable; and amplifiers 12a, 12b, 12c, etc. are therefore designed to saturate for channel signals greater than about 100 mv. Thus, for a channel-signal range above about 100 mv., the signals on the weak-signal channels—because of their saturated amplifiers—become meaningless; and relay 20— flips to the strong-signal state, wherein the strong signals are taken from the strong-signal sub-integrators of integrators 14a, 14b, 14c, etc. In this way the circuit covers a wide range, a selected limited range of the wide range being selected by the weak-signal peak-level detector 18 and relay 20.

Thus, on the occurrence of a channel-signal exceeding 100 mv., it is applied directly to comparator 34; whereas the comparator had previously seen a 1,000 mv. amplified weak-signal. Therefore, operational amplifier 36 now produces an error-signal of the opposite polarity; this opposite-polarity error-signal reversing the rotation of motor 38, and increasing the gain of system-amplifier 52 so that the 100 mv. channel-signal is now amplified to the desired 10,000 mv. display voltage.

Simultaneously, the motor rotation causes potentiometer 44 to provide a control-signal that resets signal-generator voltage-divider 92, so that relay 68 again produces the lower-valued 100 mv. reference signal; and disconnects the capacitance 84 from the scanner-drive 56. As a result, the reference bar R3 of FIGURE 1e has a 100 mv. level, and a narrow width.

It should be noted that relay 20 has its lowermost switch 24j connected in such a manner that when the relay is in its upper strong-signal position, switch 24j adds a capacitance 86 in the second flip-flop (I) of scanner-drive 56, to widen the second bar of the bar-chart display, in the manner previously explained. Thus, when the second bar of the bar-chart is wide, this indicates that strong-signals—rather than weak signals—are being used.

Referring to FIGURE 1e, it is seen that the second bar (F1) is wide—indicating a strong channel signal, and that the reference bar (R3) is narrow—indicating a low-level reference-voltage of 100 mv. Thus, this combination of bar widths indicates that the reference-value of 100 mv. is to be used to evaluate a not-amplified strong channel signal of 400 mv.

Consider now the signals of FIGURE 1f. Here the 3,000 mv. F3 channel-signal sets relay 20 to its strong-signal position, and produces a wide second bar. The strength of this signal causes a motor rotation that reduces (1) the gain of system-amplifier 52, so that the F3 bar is normalized to occupy the maximum available height of the display, and (2) resets the signal-generator 60 to produce a wide reference bar and a reference signal of 1,000 mv. Now the combination of wide bar widths indicates that the 1,000 mv. reference value is to be used to evaluate a strong channel signal of 3,000 mv.

The parameters of motor 38, operational amplifier 36, potentiometers 40 and 42, etc. are so chosen that the normal operation of comparator 34 rotates motor 38 an amount sufficient to adjust potentiometer 42 and the resultant gain of system amplifier 52 so that the channel signal at relay-switch 24a is amplified to the desired 10,000 millivolt display-voltage; and this result is achieved for a variety of magnitudes of channel signals.

In use, devices such as microphones, transducers, etc. continuously apply input signals to frequency separator 10; and the various integrators—depending upon their time constants—are continuously updating their stored signals. Thus, at a given instant, a given set of channel-signals is available. The highest-magnitude amplified channel-signal, acting in the manner described above, is available as a strength-signal at the input of gate circuit 32. Assume that a bar-chart has just been produced, and that scanner drive 56 is at stage IX of FIGURE 2b. This stage applies a momentary enabling signal to gate circuit 32, and the strength-signal from weak-signal detector 18 therefore traverses the now-enabled gate circuit 32, is applied to field coil 22, and sets relay 20—which provides a coding-width signal for the second bar of the bar-chart and applies the strongest channel signal through relay 20 to comparator 34. Relay 20 maintains this setting until the next enabling-signal permits a change.

When scanner-drive 56 advances to its next stage, X, this stage applies a momentary power signal to motor 38, by momentarily enabling power source 80. The motor thereupon rotates in accordance with the error-signal from comparator 34—causing potentiometers 40, 42, and 44 to produce control signals that set the gain of system-amplifier 52, select a suitable reference-signal, and provide a coding-width signal for the reference bar. As scanner-drive 56 advances to its next stage, "Ref," the power source and motor 38 are disabled; and the system is set to produce the next bar-chart.

In this way, the disclosed circuit periodically samples the incoming signal, and produces a corresponding bar-chart that is repetitively adjusted as to range and scale according to the sampled values of the incoming signals.

The disclosed arrangement produces a four-scale bar-chart; but the same principles may be used for producing additional scales. To achieve this result, another—or additional—relays are used to handle signals of higher or lower strength; and to vary the width of various bars to indicate the scale that is being used. Of course, it is not necessary to code the first two bars of the display, as any bars may have their widths changed to indicate the reference-value.

While the above explanation has been presented in terms of a shock-wave signal that is split into various spectra, it is obvious that other types of information (such as sales, stock market reports, and the like which do not have to be split into spectra) may be used; and that displays other than bar-charts may be presented.

For example, the visual indicia have been described in terms of bars; but alternatively, they may take the form of discs, circles, lines, dots, or the like. In these cases, the magnitude of the quantities represented by the discs may be represented by their brightness; the magnitude of the quantities represented by circles may be represented by their diameters; and the magnitude of the quantities represented by dots may be represented by their number or density. In these cases, the full-scale normalized representation may be portrayed by a given brightness, a given diameter, or a given number or density of dots. In portraying this normalized full-scale presentation, the above-described gain control may be used; and the utilization device would present the greatest magnitude signal—not as a bar having a normalized length—but rather as a disc with a normalized brightness, a circle with a normalized diameter, or a dot pattern with a normalized number or density. In these cases also, the scale reference index, rather than being a bar of a predetermined length, would be a disc of a given brightness, a circle of a predetermined diameter, or a dot pattern having a predetermined number or density of dots.

In any case, scale-means such as comparator 34 presets a gain-control device such as motor 38 and its associated potentiometers so that apparatus, such as a system-amplifier, provides a suitable signal to produce the desired brightness, diameter, or number or density of dots. It is thus apparent that the disclosed invention may produce a normalized representation of any of a number of desired forms; and in each case the display will have the strongest signal normalized, and will have a reference scale indicia having a predetermined value for indicating the values of the various quantities comprising the display.

What is claimed is:
1. A display device for providing representation of variable quantities by displaying visual indicia having values that represent magnitude of the quantities and that vary within a full scale of indicia values, comprising:
   means for displaying ascale indicia having a value representing scale;
   selection means for selecting one of said quantities of greatest magnitude;
   scale means for varying the value of the display indicia representing said one quantity to provide a substantially full scale representation thereof; and
   means responsive to the scale means for proportionately varying the value of said scale indicia and the indicia representing other quantities.
2. The device of claim 1 including means responsive to said selection means for selecting a limited range portion of the range of variation of said quantities, and displaying said indicia with such limited range portion.
3. A wide range display apparatus for displaying magnitudes of signals representing different variable quantities, comprising:
   means responsive to magnitudes of incoming signals for selecting and displaying a limited range portion;
   means for displaying a scale reference;
   means for selecting one incoming signal of greatest magnitude;
   scale means for controlling the displayed magnitude of said one signal to approach the full scale of the display apparatus; and means responsive to said scale means for controlling the displayed magnitude of the other incoming signals and of the scale reference in relation to the controlled magnitude of said one signal.

4. The apparatus of claim 3 including a system gain control device, said means for controlling comprising amplifier means responsive to the gain control device.

5. The combination comprising:
a bar-chart display;
means for causing each of a plurality of signals to produce a bar of said bar-chart display;
means for producing a reference-bar having a predetermined reference-level, as part of said bar-chart display; and
means for causing at least on bar of said bar-chart display to have a coding-width corresponding to one of a plurality of coding-widths.

6. The combination of claim 5 including
means for causing said reference-bar to have a predetermined reference-level corresponding to one of a plurality of reference-levels; and
for causing the combination of said reference-level and said coding-width to serve as a code for indicating the reference-value of said reference-bar and the other bars of said bar-chart.

7. The combination of claim 5 including
means for causing said reference-bar to have a predetermined reference-level corresponding to one of a plurality of reference-levels;
means for causing a second bar of said bar-chart to have a coding-width corresponding to one of a plurality of coding-widths; and
for causing the combination of said reference-level and said coding-widths to serve as a code for indicating the reference-value of said reference-bar and the other bars of said bar-chart.

8. The combination comprising:
means for causing each of a plurality of signals to produce a bar of a bar-chart display; and
normalizing meas for amplifying the strongest of said signals by a given amplifying factor to produce a bar occupying the maximum height of the display, and for amplifying the rest of said signals by the same amplifying factor whereby the length of the bars correspond to the original strength of said signals.

9. The combination of claim 8 including
means for producing a reference-bar having a predetermined reference-level corresponding to one of a plurality of reference-levels;
means for causing said reference bar of said bar-chart to have a coding-width corresponding to one of a plurality of coding-widths;
means for causing another bar of said bar-chart to have a coding-width corresponding to one of a plurality of coding-widths.

10. The combination of claim 9, wherein said normalizing means comprises system amplifier means for amplifying said signals;
comparator means for causing said strongest signal to produce an error-signal;
means for causing said error-signal to vary the gain of said system amplifier means to achieve said normalizing operation.

11. The combination of claim 10 including means for causing said error-signal to vary the predetermined reference-level in accordance with the strength of said strongest signal.

12. The combination of claim 10, including means for causing said error-signal to vary the coding-width in accordance with the variation of said predetermined reference level.

13. In a system for displaying a plurality of incoming signals in the form of bars of a bar-chart on a visual display device, the combination comprising:
a scanner having a plurality of input terminals and an output terminal;
means for applying each of said incoming signals to respective input terminals of said scanner;
a reference-signal source;
means for applying said reference-signal to an input terminal of said scanner;
means for driving said scanner to cause the sequential output signals from said scanner to form display-signals whose amplitudes correspond to the amplitudes of said incoming signals, and whose durations correspond to the normal timing interval of said scanner driving means;
means for applying said scanner output signals to said display device for producing a bar-chart having bars whose heights correspond to the amplitudes of said scanner output signals and to the amplitude of said reference-signal, and whose normal widths correspond to the normal timing interval of said scanner driving means;

14. The combination of claim 13 including
a comparator;
means for applying the strongest of said incoming signals to said comparator, for causing said comparator to produce an error-signal having a polarity and amplitude corresponding to the magnitude of said strongest signal;
control-signal generator means for producing a plurality of control-signals;
means for causing said error-signal to cause said control-signal generator to produce control-signals corresponding to said error-signal;
a system-amplifier;
means for applying said scanner output-signals to said display-device through said system-amplifier;
means for causing one of said control-signals to control the gain of said system-amplifier for normalizing said strongest signal to occupy the maximum height of said display device.

15. The combination of claim 14, including
means for providing a plurality of reference-signals;
means for causing one of said control-signals to determine which reference-signal is applied to said terminal of said scanner;
means for causing one of said control signals to produce a coding-width signal that changes a normal timing interval of a portion of said scanner, and thus changes the width of said reference-bar.

16. The combination of claim 15, including
means for determining whether said strongest signal exceeds a given value, and for producing a corresponding strength-signal;
means for causing said strength-signal to select a range of said signals, and to apply the strongest signal of said range to said comparator;
means for causing one of said control-signals to produce a coding-width signal that changes the normal timing interval of another portion of said scanner, and thus changes the width of another bar of said bar-chart.

17. Display apparatus for displaying a plurality of incoming-signals in the form of a bar-chart display, comprising:
peak-signal detecting means, comprising integrator circuitry, for detecting the greatest magnitude of incoming signal;
means for applying said incoming-signals to said peak-signal detecting means;
comparator means, comprising an operational amplifier having a controlled feedback loop;
means for applying the greatest-magnitude incoming signal from said peak-signal detecting means to said comparator means for causing said comparator to produce an error-signal indicative of the strength of the greatest-magnitude incoming signal;

gain-control means, comprising a reversible motor and associated potentiometers angularly oriented by the shaft of said motor;

means for applying said error-signal to said gain-control means for causing said potentiometers to produce control-signals in accordance with the stopping orientation of said motor as determined by said error-signal;

means for applying one of said control signals to said feedback loop of said comparator means, for causing said motor to stop at a given orientation;

a signal-generator means, comprising a relay having a field-coil, a first voltage-divider, and a second voltage-divider, for producing a reference-signal and a coding-width signal;

means for applying a second of said control-signals to said relay field-coil of said signal-generator for causing said first voltage-divider of said signal-generator to produce a reference-signal;

a scanner having a plurality of input terminals and an output terminal;

means for applying said reference-signal from said signal-generator and said incoming-signals to said input terminals of said scanner;

scanner drive means for driving said scanner to produce at said output terminal, a series of sequential signals corresponding to the signals applied to said input terminals;

a system-amplifier, comprising an operational amplifier having a controlled feedback loop;

means for applying the output-signals from the output terminal of said scanner to said system-amplifier;

means for applying a third of said control-signals to said feedback loop of said system-amplifier for controlling the gain of said system-amplifier for causing said system amplifier to normalize said greatest-magnitude incoming signal by amplifying said greatest-magnitude incoming-signal to use substantially the maximum space available in said display, and said system-amplifier amplifying said reference signal and said other incoming-signals to proportionate values of said display;

means for applying said code-width signal from said signal-generator to said scanner drive means for controlling the width of a first selected bar of said bar-chart display in accordance with the value of said reference-signal.

18. The combination of claim 17 including a second relay having a field coil, a plurality of pairs of input terminals, and respective output terminals corresponding to each pair of input terminals, one input terminal of each pair defining a set of input terminals;

means for applying selected range-portions of said incoming-signals to respective sets of said relay input terminals;

means for applying a signal from said peak-signal detecing means to said second-relay field coil for selecting a range-portion of incoming signals;

means, associated with said relay, for producing a second code-width signal indicative of the selected range-portion of incoming signals;

means for applying said second code-width signal to said scanner drive means for controlling the width of a second selected bar of said bar-chart display in accordance with said selected range portion of incoming signals.

19. In a bar-chart display, means for producing a reference-bar having a reference-level corresponding to one of a plurality of predetermined reference-signals;

means for causing a bar of said bar-chart to have a coding width;

whereby the combination of said reference-level and said coding-width establish a reference-value for said reference-bar, for indicating the value of other bars of said bar-chart.

20. The combination of claim 19 including means for associating said coding-width with said reference-bar.

21. The combination of claim 19 including means for associating said coding-width with a bar other than said reference-bar.

22. The combination of claim 19 including means for associating said coding-width with said reference-bar, and a second means for associating said coding-width with a different bar.

23. The combination of claim 19 including means for associating said coding-width with said reference-bar, and a second means for associating said coding-width with a bar adjacent said reference-bar.

24. The combination comprising:

a visual presentation having a plurality of displays;

means for causing individual incoming-signals to produce respective displays for forming said presentation;

means for producing a reference-display, having a predetermined reference-level, as part of said presentation; and means for causing at least one display of said presentation to have a coding-characteristic corresponding to one of a plurality of coding-characteristics for indicating the absolute value of said reference-display.

References Cited

UNITED STATES PATENTS 3,161,827  12/1964  Buisson _____ 324—140 X
3,248,650  4/1966  Bialkowski et al. _____ 324—121

ALFRED E. SMITH, Primary Examiner

U.S. Cl. X.R.

283—1;  315—22;  328—148;  324—121;  340—324; 346—23